(12) United States Patent
Si et al.

(10) Patent No.: US 12,100,950 B2
(45) Date of Patent: Sep. 24, 2024

(54) NET LOAD FORECASTING METHOD AND APPARATUS FOR NEW ENERGY ELECTRIC POWER MARKET

(71) Applicant: STATE GRID ZHEJIANG ELECTRIC POWER CO., LTD. TAIZHOU POWER SUPPLY COMPANY, Zhejiang (CN)

(72) Inventors: Jiandong Si, Zhejiang (CN); Feng Guo, Zhejiang (CN); Zhijian Yu, Zhejiang (CN); Jiahao Zhou, Zhejiang (CN); Lintong Wang, Zhejiang (CN); Yefeng Luo, Zhejiang (CN); Zhouhong Wang, Zhejiang (CN); Dongbo Zhang, Zhejiang (CN); Yuande Zheng, Zhejiang (CN); Yuyin Qiu, Zhejiang (CN); Jie Yu, Zhejiang (CN); Zihuai Zheng, Zhejiang (CN); Lei Hong, Zhejiang (CN); Binren Wang, Zhejiang (CN); Ying Ren, Zhejiang (CN); Yuxi Tu, Zhejiang (CN); Huili Xie, Zhejiang (CN)

(73) Assignee: STATE GRID ZHEJIANG ELECTRIC POWER CO., LTD. TAIZHOU POWER SUPPLY COMPANY, Taizhou (CN)

( * ) Notice: Subject to any disclaimer, the term of this patent is extended or adjusted under 35 U.S.C. 154(b) by 0 days.

(21) Appl. No.: 17/762,366

(22) PCT Filed: Jan. 14, 2022

(86) PCT No.: PCT/CN2022/072169
§ 371 (c)(1),
(2) Date: Mar. 21, 2022

(87) PCT Pub. No.: WO2023/065553
PCT Pub. Date: Apr. 27, 2023

(65) Prior Publication Data
US 2024/0055856 A1    Feb. 15, 2024

(30) Foreign Application Priority Data
Oct. 21, 2021    (CN) .......................... 202111226998.3

(51) Int. Cl.
*H02J 3/00*        (2006.01)
*G06Q 10/04*       (2023.01)
*G06Q 50/06*       (2012.01)

(52) U.S. Cl.
CPC .............. *H02J 3/003* (2020.01); *G06Q 10/04* (2013.01); *G06Q 50/06* (2013.01)

(58) Field of Classification Search
CPC ......... H02J 3/003; G06Q 10/04; G06Q 50/06; Y04S 10/50
See application file for complete search history.

(56) References Cited

U.S. PATENT DOCUMENTS

2004/0260489 A1* 12/2004 Mansingh ................ H02J 3/00
                                                       702/60
2007/0244604 A1* 10/2007 McNally ................ G06Q 50/06
                                                       700/291
(Continued)

OTHER PUBLICATIONS

Markovic, Romana, et al. "Day-ahead prediction of plug-in loads using a long short-term memory neural network." Energy and Buildings 234 (2021) (Year: 2021).*

(Continued)

*Primary Examiner* — Christopher E. Everett

(57) ABSTRACT

Disclosed are a net load forecasting method and apparatus for a new energy electric power market. The method includes: obtaining and performing data preprocessing on new energy output data and external environmental data, and extracting strongly correlated features from the new energy (Continued)

output data and the external environmental data after the data preprocessing; performing feature expansion on the strongly correlated features, and inputting the strongly correlated features after the feature expansion into a preconstructed regression forecasting model, to obtain a first forecast value; obtaining and performing data preprocessing on user load data and load influencing factor data, and inputting the user load data and the load influencing factor data after the data preprocessing into a FNN-LSTM hybrid model, to obtain a second forecast value; and calculating a difference between the second forecast value and the first forecast value, to obtain a net load forecasting result.

4 Claims, 3 Drawing Sheets

(56) References Cited

U.S. PATENT DOCUMENTS

| | | | | |
|---|---|---|---|---|
| 2009/0113049 | A1* | 4/2009 | Nasle | G06N 7/06 |
| | | | | 709/224 |
| 2014/0156322 | A1* | 6/2014 | Monforte | H02J 3/004 |
| | | | | 705/7.11 |
| 2016/0211664 | A1* | 7/2016 | Subbotin | H02J 3/003 |
| 2016/0247065 | A1* | 8/2016 | Nasle | G06N 5/02 |
| 2017/0091615 | A1* | 3/2017 | Liu | G06N 3/044 |
| 2017/0102683 | A1* | 4/2017 | Bharti | G05B 19/0428 |
| 2017/0317495 | A1* | 11/2017 | Pavlovski | G01R 22/00 |
| 2018/0066860 | A1* | 3/2018 | Carlson | F24F 11/77 |
| 2018/0217568 | A1* | 8/2018 | Parvania | G06Q 10/06314 |
| 2019/0122132 | A1* | 4/2019 | Rimini | G06Q 50/06 |
| 2019/0155234 | A1* | 5/2019 | Devi | H02J 3/381 |
| 2019/0165580 | A1* | 5/2019 | Doherty | H02J 3/003 |
| 2020/0067312 | A1* | 2/2020 | Pavlovski | H02J 3/003 |
| 2021/0203159 | A1* | 7/2021 | Liu | G05B 19/042 |
| 2022/0414523 | A1* | 12/2022 | Khatibi | G06N 20/00 |
| 2023/0324860 | A1* | 10/2023 | Taheri | G05B 15/02 |
| | | | | 700/275 |
| 2024/0070589 | A1* | 2/2024 | Duan | G06F 16/901 |

OTHER PUBLICATIONS

Mujeeb, Sana, et al. "Deep long short-term memory: A new price and load forecasting scheme for big data in smart cities." Sustainability 11.4 (2019): 987. (Year: 2019).*

Guo, Weilin, Xiaoyan Jiang, and Liang Che. "Short-Term Photovoltaic Power-Forecasting based on Machine Learning." 2019 IEEE 3rd International Electrical and Energy Conference (CIEEC). IEEE, 2019. (Year: 2019).*

Gonzalez, Pedro A., and Jesus M. Zamarreno. "Prediction of hourly energy consumption in buildings based on a feedback artificial neural network." Energy and buildings 37.6 (2005): 595-601. (Year: 2005).*

Chae, Young Tae, et al. "Artificial neural network model for forecasting sub-hourly electricity usage in commercial buildings." Energy and Buildings 111 (2016): 184-194. (Year: 2016).*

Cao, Yukun, and Liai Gui. "Multi-step wind power forecasting model using LSTM networks, similar time series and LightGBM." 2018 5th International Conference on Systems and Informatics (ICSAI). IEEE, 2018. (Year: 2018).*

* cited by examiner

NET LOAD FORECASTING METHOD AND APPARATUS FOR NEW ENERGY ELECTRIC POWER MARKET

FIELD OF THE TECHNOLOGY

This application relates to the field of load forecasting technologies, and specifically to a net load forecasting method and apparatus for a new energy electric power market.

BACKGROUND OF THE DISCLOSURE

In order to achieve "carbon peaking" and "carbon neutrality", an electric power system with new energy as the main body plays an increasingly important role, which requires a future electric power market to accurately perceive a new energy power generation and an electrical load.

However, a forecasting of a net load caused by the electrical load at a user side and a power generation output at a new energy side is affected by various factors, such as external climate environment, social economy, industry development, related policies, etc. In addition, there exist information barriers between these factors and data resources related to forecasting of the new energy power generation and the electrical load, which makes it impossible to accurately forecast the net load caused by the electrical load at the user side and the power generation output at the new energy side, thereby affecting regulation efficiency of the electric power system.

SUMMARY

In order to solve shortcomings and deficiencies in the related art, the present disclosure provides a net load forecasting method for a new energy electric power market, including:
  obtaining new energy output data and multiple pieces of external environmental data, performing data preprocessing on the new energy output data and the multiple pieces of external environmental data, and extracting strongly correlated features from the new energy output data and the multiple pieces of external environmental data after the data preprocessing;
  performing feature expansion on the strongly correlated features, and inputting the strongly correlated features after the feature expansion into a preconstructed regression forecasting model, to obtain a first forecast value;
  obtaining user load data and multiple pieces of load influencing factor data, performing data preprocessing on the user load data and the multiple pieces of load influencing factor data, and inputting the user load data and the multiple pieces of load influencing factor data after the data preprocessing into a feedforward neural network (FNN)-long short-term memory (LSTM) hybrid model, to obtain a second forecast value; and
  calculating a difference between the second forecast value and the first forecast value, to obtain a net load forecasting result.

Optionally, the operation of extracting strongly correlated features from the new energy output data and the multiple pieces of external environmental data after the data preprocessing includes:
  calculating correlation coefficients between the new energy output data and the multiple pieces of external environmental data, and selecting at least one piece of external environmental data whose correlation coefficient is greater than a preset value from the multiple pieces of external environmental data; and
  using the selected at least one piece of external environmental data and the new energy output data together as the strongly correlated features.

Optionally, the new energy output data is obtained from a dispatch and control cloud platform or an electricity market data report.

Optionally, the regression forecasting model is constructed based on a light gradient boosting machine (LightGBM) algorithm.

Optionally, the operation of performing feature expansion on the strongly correlated features, and inputting the strongly correlated features after the feature expansion into a preconstructed regression forecasting model, to obtain a first forecast value includes:
  calculating an average value, a maximum value, and a minimum value of the strongly correlated features, and adding the average value, the maximum value, and the minimum value of the strongly correlated features to the strongly correlated features, to obtain the strongly correlated features after the feature expansion; and
  inputting the strongly correlated features after the feature expansion into the regression forecasting model, and forecasting a power generation of a new energy unit by using the LightGBM algorithm, to obtain the first forecast value.

Optionally, the operation of obtaining user load data and multiple pieces of load influencing factor data, performing data preprocessing on the user load data and the multiple pieces of load influencing factor data, and inputting the user load data and the multiple pieces of load influencing factor data after the data preprocessing into a feedforward neural network (FNN)-long short-term memory (LSTM) hybrid model, to obtain a second forecast value includes:
  inputting the multiple pieces of load influencing factor data after the data preprocessing into a first FNN network, and inputting the user load data after the data preprocessing into a LSTM network; and
  inputting an output of the LSTM network and an output of the first FNN network to a second FNN network, and using an output of the second FNN network as the second forecast value.

Optionally, the user load data is obtained from a dispatch and control cloud platform, an electric power marketing system, or an electric power market data report.

Optionally, the multiple pieces of load influencing factor data include a weather influencing factor, a tax influencing factor, and a business influencing factor.

The present disclosure also provides a net load forecasting apparatus for a new energy electric power market based on the same concept, including:
  an extracting unit, configured to obtain new energy output data and multiple pieces of external environmental data, perform data preprocessing on the new energy output data and the multiple pieces of external environmental data, and extract strongly correlated features from the new energy output data and the multiple pieces of external environmental data after the data preprocessing;
  a first forecasting unit, configured to perform feature expansion on the strongly correlated features, and input the strongly correlated features after the feature expansion into a preconstructed regression forecasting model, to obtain a first forecast value;
  a second forecasting unit, configured to obtain user load data and multiple pieces of load influencing factor data, perform data preprocessing on the user load data and the multiple pieces of load influencing factor data, and input the user load data and the multiple pieces of load influencing factor data after the data preprocessing into a FNN-LSTM hybrid model, to obtain a second forecast value; and an output unit, configured to calculate a difference between the second forecast value and the first forecast value, to obtain a net load forecasting result.

The present disclosure has at least the following beneficial effects.

The present disclosure, by introducing meteorological conditions and external influencing factors into artificial intelligence models, realizes net load forecasting which is suitable for the electric power market and dispatching applications. In addition, according to different characteristics of the factors at both the new energy side and the user side that are affecting the net load, different artificial intelligence algorithms are used for the forecasting. This breaks the information barriers between data, so as to realize interconnection and intercommunication of multi-source data, thereby improving accuracy of the net load forecasting.

BRIEF DESCRIPTION OF THE DRAWINGS

In order to clear describe the technical solutions of the present disclosure, the following briefly introduces accompanying drawings used in the description of the embodiments. The accompanying drawings in the following are merely some embodiments of the present disclosure. The person skilled in the art may obtain other drawings according to these drawings without any creative effort.

DESCRIPTION OF EMBODIMENTS

Figure 1:
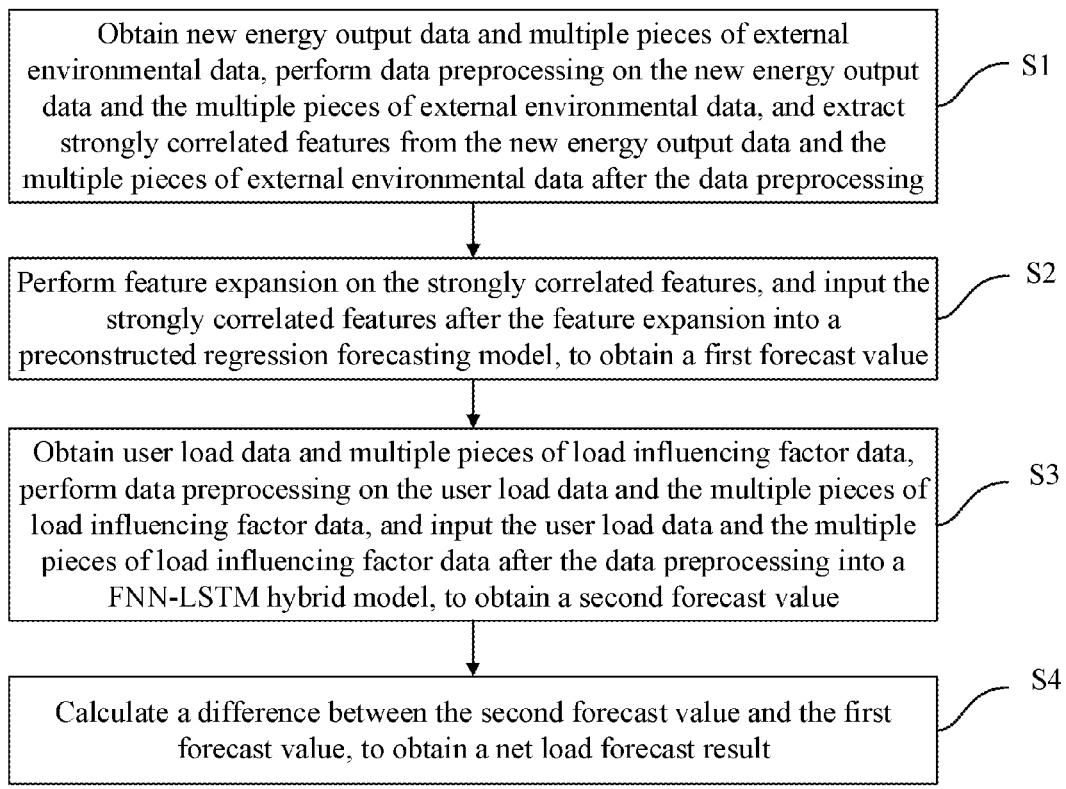
FIG. 1 is a schematic flowchart of a net load forecasting method for a new energy electric power market according to an embodiment of the present disclosure.

To make the objectives, technical solutions, and advantages of the embodiments of the present disclosure clearer, the technical solutions according to the embodiments of the present disclosure are described below with reference to the accompanying drawing. The described embodiments are merely some rather than all of the embodiments of the present disclosure. Based on the embodiments of the present disclosure, all other embodiments obtained by those of ordinary skill in the art without creative efforts shall fall within the protection scope of the present disclosure.

Terms "first", "second", "third", "fourth", etc. (if present) in the description and claims of the present disclosure and the drawing are used to distinguish similar objects and are not intended to describe a specific order or sequence. The objects used in such a manner may be exchanged under a proper condition, so that the described embodiments of the present disclosure may be implemented in other sequences apart from those illustrated or described herein.

In various embodiments of the present disclosure, sequence numbers of processes do not mean an execution order. The execution order of the processes should be determined by their functionalities and internal logic, and should not constitute any limitation on the implementation process of the embodiments of the present disclosure.

In the present disclosure, "including", "comprising", and "having" and any variations thereof are intended to cover non-exclusive inclusion. For example, a process, a method, a system, a product or an apparatus including a series of steps or units is not necessarily limited to steps or units that are expressly listed, but may instead include other steps or units that are not expressly listed or are inherent to the process, the method, the product or the apparatus.

In the present invention, "plurality" refers to two or more; "and/or" is only association relationships that describes associated objects, indicating that there may exist three kinds of relationships. For example, "and/or B" means three conditions, including that A exists alone, A and B exist at the same time, and B exists alone. A character "I" generally indicates that the associated objects are in an "or" relationship; "including A, B and C" or "including A, B, C" means including all of A, B, and C; "contains A, B or C" means including one of A, B, and C, and "including A, B and/or C" means including any one or any two or three of A, B, and C.

In the present disclosure, "B corresponding to A", "A corresponds to B", or "B corresponds to A" means that B is associated with A, and B may be determined according to A. The determining B according to A does not mean that B is determined based only on A, but may also be determined based on A and/or other information. Matching between A and B means that a similarity between A and B is greater than or equal to a preset threshold.

Depending on the context, "if" as used herein may be interpreted as "in a case that" or "when" or "in response to determining" or "in response to detecting".

In the following, the technical solution of the present disclosure is described in detail with reference to specific embodiments. The following specific embodiments may be combined with each other. In addition, the same or similar concepts or processes may not be repeatedly described in some embodiments.

EMBODIMENT 1

As shown in FIG. 1, this embodiment of the present disclosure provides a net load forecasting method for a new energy electric power market, including:

S1. Obtain new energy output data and multiple pieces of external environmental data, perform data preprocessing on the new energy output data and the multiple pieces of external environmental data, and extract strongly correlated features from the new energy output data and the multiple pieces of external environmental data after the data preprocessing.

S2. Perform feature expansion on the strongly correlated features, and input the strongly correlated features after the feature expansion into a preconstructed regression forecasting model, to obtain a first forecast value.

S3. Obtain user load data and multiple pieces of load influencing factor data, perform data preprocessing on the user load data and the multiple pieces of load influencing factor data, and input the user load data and the multiple pieces of load influencing factor data after the data preprocessing into a FNN-LSTM hybrid model, to obtain a second forecast value.

S4. Calculate a difference between the second forecast value and the first forecast value, to obtain a net load forecasting result.

The net load forecasting method provided in this embodiment introduces different influencing factors, such as the multiple pieces of external environment data and the multiple pieces of load influencing factor data, which improves the accuracy of the net load forecasting. In addition, different artificial intelligence algorithms are used for different data characteristics of the different influencing factors, so as to break the information barriers between different data systems, thereby realizing integration, sharing, analysis and application of various data information resources. The net load forecasting method provided herein improves the accuracy of the net load forecast result for the new energy electric power market, which is conducive to new energy consumption and interconnection, thereby improving a comprehensive service level of grid companies and customer satisfaction for users' electric power consumption. In this embodiment, different forecasting models are used for the new energy power generation and the user load. The reason is that the influencing factors related to the new energy power generation are usually the external environmental data, which has timing and continuity characteristics. In this case, the LightGBM algorithm is suitable. The influencing factors related to the user load are of various types, including local economic policies, electricity consumption policies, and impacts of holidays, most of which are discrete and sparse feature data. In this case, the FNN network is suitable. In addition, the user load data itself has timing characteristics, which is suitable for the LSTM network. Thus, the FNN-LSTM hybrid model is used for the forecasting.

Figure 2:
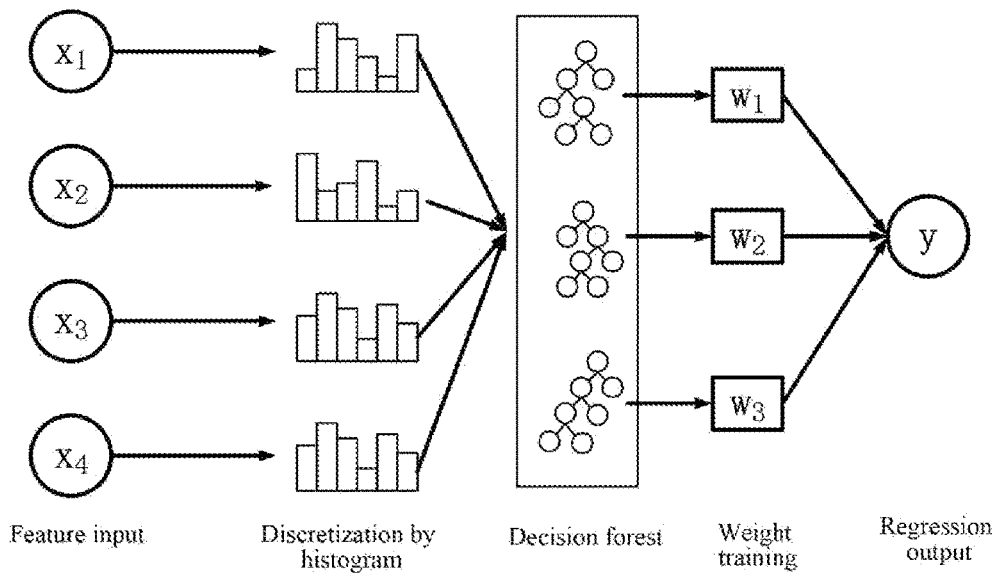
FIG. 2 is a schematic flowchart of an algorithm of a regression forecasting model.

In an embodiment, a linear regression model is constructed by using the LightGBM algorithm at a source side. The LightGBM algorithm is improved and optimized on the basis of a decision tree algorithm. The LightGBM algorithm has an algorithm structure as shown in FIG. 2. Discretization is performed on input features $x_1$, $x_2$, $x_3$ and $x_4$ by histogram analysis, to generate a decision forest including multiple decision trees; a parallel training of the decision forest is performed, and a weighted sum of weights $w_1$, $w_2$ and $w_3$ obtained through weight training on each decision result is calculated, to generate a regression output result y. The LightGBM algorithm improves algorithm accuracy by combining weak classifiers into a strong classifier, and greatly enhances computational efficiency by parallel computing. Compared with an extreme gradient boosting (Xgboost) algorithm, the LightGBM algorithm runs 10 times faster, with a memory usage being only ⅙. There has an explosive growth in a data volume of the new energy output data and the related external environment data at the source side with the increase of an operating time, thus the linear regression model constructed by using the LightGBM algorithm is more suitable.

An actual output of the new energy power generation, such as photovoltaic and wind power generation, is usually affected by external environmental factors. However, the external environmental factors affecting different types of new energy units may be different. Herein, the wind power generation is used as an example. Under an ideal condition, a conversion from wind energy into a wind power generation may be expressed as:

$$P = \frac{1}{2}\rho A v^3 C_p$$

Where, P is an actual output of a wind turbine unit, A is a swept area of a blade, $\rho$ is an air density, v is a wind speed, and $C_p$ is a wind energy conversion rate. Considering that the actual output of the wind turbine unit is strongly correlated with external environmental data, such as a current wind speed, wind direction, and air pressure, and it is also directly affected by an actual operating state of the wind turbine unit, in an embodiment, external weather forecast data and internal wind power generation output data are combined as a data basis.

The new energy output data and the multiple pieces of external environmental data are obtained from different business systems, so the data preprocessing is required before using the new energy output data and the multiple pieces of external environmental data for forecasting. In an embodiment, the data preprocessing includes removing abnormal data and invalid data, filling missing values, standardization processing, normalization processing, etc. The data preprocessing is a conventional technical means in feature engineering (FE), which is not be detailed herein.

In order to introduce the external environmental factors that are related to the new energy power generation in a more targeted manner, in an embodiment, the operation of extracting strongly correlated features from the new energy output data and the multiple pieces of external environmental data after the data preprocessing specifically includes:

calculating correlation coefficients between the new energy output data and the multiple pieces of external environmental data, and selecting at least one piece of external environmental data whose correlation coefficient is greater than a preset value from the multiple pieces of external environmental data. In an embodiment, the correlation coefficient may be a Pearson correlation coefficient, a Kendall correlation coefficient, a Spearman correlation coefficient, etc. The correlation coefficient may indicate a correlation between a new energy output and external environment. A large correlation coefficient means a high correlation between the new energy output and the external environment. A correlation coefficient exceeding a certain preset value may indicate a strong correlation. Then, the selected at least one piece of external environmental data and the new energy output data are used together as the strongly correlated features.

Since a condition of the new energy output may directly affect the new energy power generation, the multiple pieces of external environmental data that are strongly correlated with the new energy output data may be indirectly regarded as the strongly correlated features affecting the new energy power generation.

In an embodiment, the new energy output data may be obtained from a dispatch and control cloud platform or an electricity market data report. The multiple pieces of external environment data include at least two types of meteorological data, such as a wind speed, a wind direction, a temperature, a humidity, and an air pressure.

In an embodiment, after the strongly correlated data are extracted, in order to further improve the accuracy of the forecasting, the feature expansion on the strongly correlated data is performed by the feature engineering, specifically including: calculating an average value, a maximum value, and a minimum value of the strongly correlated features, and adding the average value, the maximum value, and the minimum value of the strongly correlated features to the strongly correlated features, to obtain the strongly correlated features after the feature expansion, which reduces a dimension of the multiple pieces of external environment data, and also reduces impact on the accuracy of the forecasting, thereby improving the forecast efficiency; and finally, inputting the strongly correlated features after the feature expansion into the regression forecasting model, and forecasting the power generation of the new energy unit by using the LightGBM algorithm, to obtain the first forecast value. In this way, a forecast result of the new energy power generation at the source side is obtained.

Figure 3:
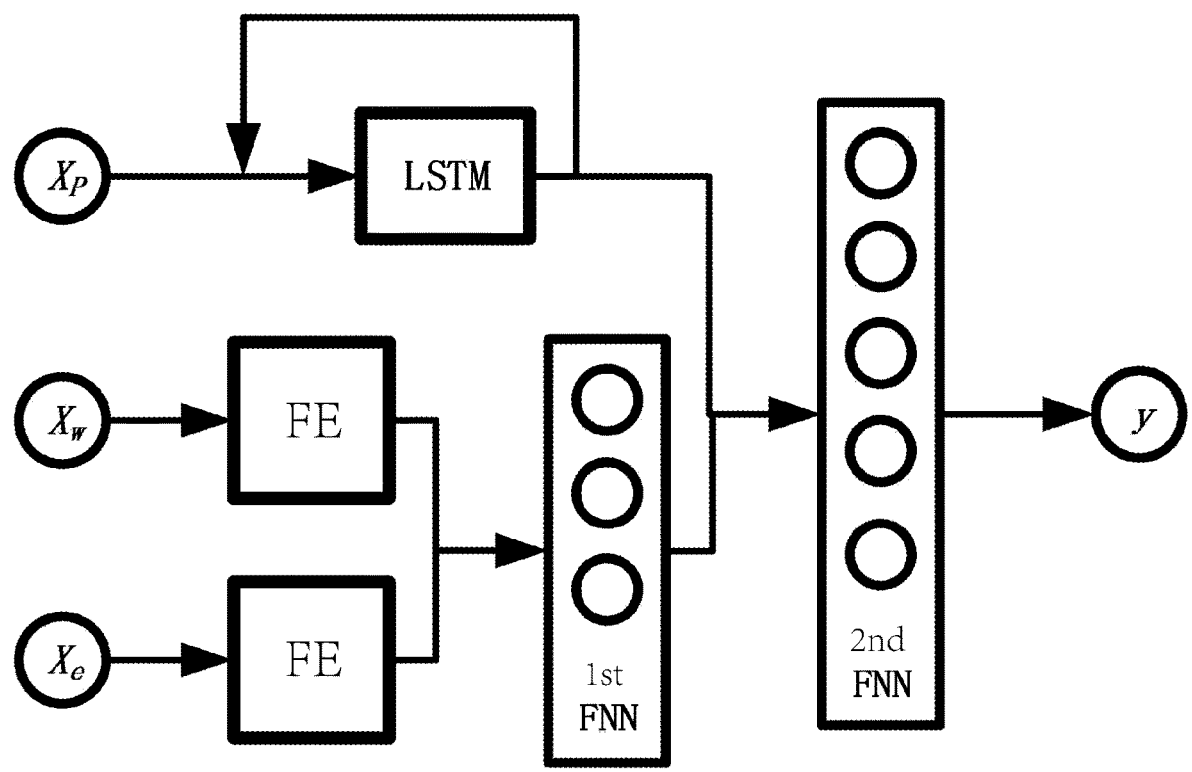
FIG. 3 is a schematic structural diagram of a FNN-LSTM hybrid model.

In an embodiment, the FNN-LSTM hybrid model is used at the user side, as shown in FIG. 3, including a LSTM network, a first FNN network, and a second FNN network. The first FNN network is used to forecast an influence degree of current load influencing factor data on the user load, such as meteorological data $X_w$ and other external influencing factor data $X_e$. The LSTM network is used to make a preliminary forecast of the user load. The FNN network is able to process discrete and sparse input features, which fits characteristics of the load influencing factors. Finally, the second FNN network is used to adjust according to the influence degrees forecasted by the first FNN network and the user load forecasted by the LSTM network, to obtain a final forecast result of the user load, specifically including:

inputting the multiple pieces of load influencing factor data after the data preprocessing into the first FNN network by the featuring engineering, and inputting the user load data after the data preprocessing into the LSTM network. The user load is usually a continuously changing time series. The LSTM network is one with an additional memory control module on the basis of a recurrent neural network (RNN) network, which overcomes the "exploding gradients" or "vanishing gradients" problem generated by the RNN network for long sequences of inputs. Thus, the LSTM model may be used to make the preliminary forecast of the user load. In addition, the first FNN network in this embodiment forecasts an increased or decreased load amount on a user based on the multiple pieces of load influencing factor data, so as to obtain the influence degrees of the multiple pieces of load influencing factor data to the user load; and inputting an output of the LSTM network and an output of the first FNN network to the second FNN network, and using an output of the second FNN network as the second forecast value. In this way, the forecast result of the user load at the user side is obtained.

In an embodiment, the user load data may be obtained from a dispatch and control cloud platform, an electric power marketing system, or an electric power market data report. The multiple pieces of load influencing factors include a weather influencing factor, a tax influencing factor, and a business influencing factor.

Finally, the difference between the second forecast value and the first forecast value is calculated, namely the net load=the user load–the new energy power generation, so as to realize accurate net load forecasting.

Figure 4:
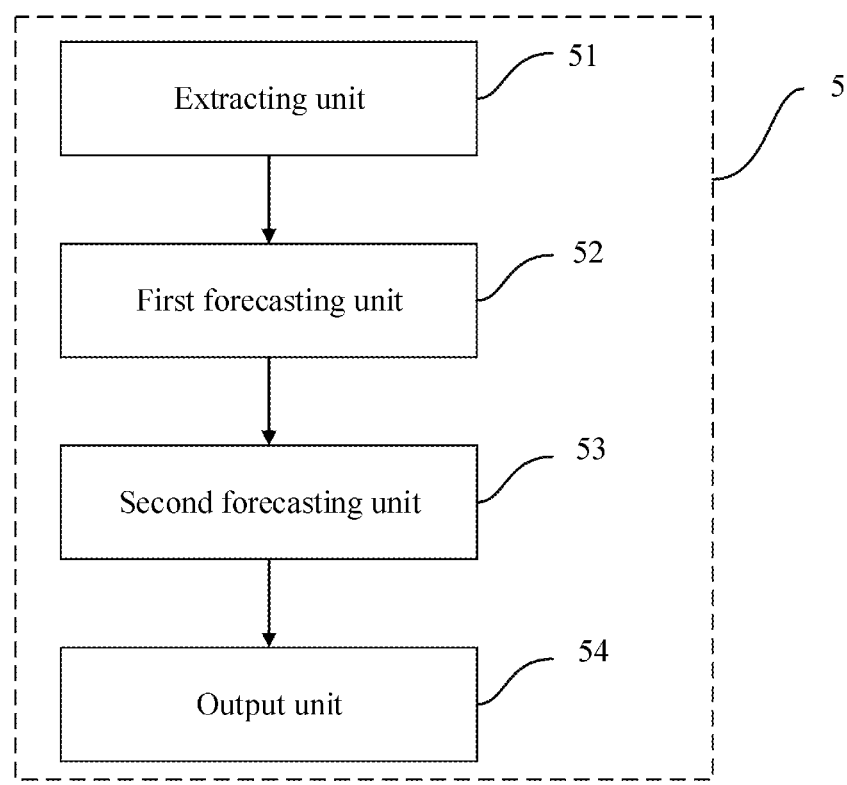
FIG. 4 is a block diagram of a net load forecasting apparatus for a new energy electric power market according to an embodiment of the present disclosure.

As shown in FIG. 4, an embodiment of the present disclosure provides a net load forecasting apparatus for a new energy electric power market, including an extracting unit 51, a first forecasting unit 52, a second forecasting unit 53, and an output unit 54.

The extracting unit 51 is configured to obtain new energy output data and multiple pieces of external environmental data, perform data preprocessing on the new energy output data and the multiple pieces of external environmental data, and extract strongly correlated features from the new energy output data and the multiple pieces of external environmental data after the data preprocessing.

The first forecasting unit 52 is configured to perform feature expansion on the strongly correlated features, and input the strongly correlated features after the feature expansion into a preconstructed regression forecasting model, to obtain a first forecast value.

The second forecasting unit 53 is configured to obtain user load data and multiple pieces of load influencing factor data, perform data preprocessing on the user load data and the multiple pieces of load influencing factor data, and input the user load data and the multiple pieces of load influencing factor data after the data preprocessing into a FNN-LSTM hybrid model, to obtain a second forecast value.

The output unit 54 is configured to calculate a difference between the second forecast value and the first forecast value, to obtain a net load forecasting result.

The sequence numbers in the foregoing embodiments are merely for description, and do not indicate an order in which the components are assembled or used.

The above descriptions are merely embodiments of the present disclosure, and are not intended to limit the present disclosure. Any modification, equivalent replacement, improvement, etc. made within the spirit and principle of the present disclosure shall all be included within the protection scope of the present disclosure.

What is claimed is:

1. A net load forecasting method for a new energy electric power market, comprising:
    obtaining new energy output data and multiple pieces of external environmental data, performing data preprocessing on the new energy output data and the multiple pieces of external environmental data, and extracting strongly correlated features from the new energy output data and the multiple pieces of external environmental data after the data preprocessing;
    performing feature expansion on the strongly correlated features, and inputting the strongly correlated features after the feature expansion into a preconstructed regression forecasting model, to obtain a first forecast value;
    obtaining user load data and multiple pieces of load influencing factor data, performing data preprocessing on the user load data and the multiple pieces of load influencing factor data, and inputting the user load data and the multiple pieces of load influencing factor data after the data preprocessing into a feedforward neural network (FNN)-long short-term memory (LSTM) hybrid model, to obtain a second forecast value; and
    calculating a difference between the second forecast value and the first forecast value, to obtain a net load forecasting result;
    wherein the new energy output data is obtained from a dispatch and control cloud platform or an electric power market data report;
    wherein the multiple pieces of external environment data comprise at least two types of meteorological data selected from a group consisting of a wind speed, a wind direction, a temperature, a humidity, and an air pressure;
    wherein the new energy output data comprises actual output data of a photovoltaic or a wind power generation;
    wherein the regression forecasting model is constructed based on a light gradient boosting machine (LightGBM) algorithm;
    wherein the performing feature expansion on the strongly correlated features, and inputting the strongly correlated features after the feature expansion into a preconstructed regression forecasting model, to obtain a first forecast value comprises:
    calculating an average value, a maximum value, and a minimum value of the strongly correlated features, and adding the average value, the maximum value, and the minimum value of the strongly correlated features to the strongly correlated features, to obtain the strongly correlated features after the feature expansion; and inputting the strongly correlated features after the feature expansion into the regression forecasting model, and forecasting a power generation of a new energy unit by using the LightGBM algorithm, to obtain the first forecast value;

wherein the obtaining user load data and multiple pieces of load influencing factor data, performing data preprocessing on the user load data and the multiple pieces of load influencing factor data, and inputting the user load data and the multiple pieces of load influencing factor data after the data preprocessing into a FNN-LSTM hybrid model, to obtain a second forecast value comprises:

inputting the multiple pieces of load influencing factor data after the data preprocessing into a first FNN network, and inputting the user load data after the data preprocessing into a LSTM network; and inputting an output of the LSTM network and an output of the first FNN network to a second FNN network, and using an output of the second FNN network as the second forecast value;

wherein the first forecast value is a forecast result of the power generation of a new energy unit at a source side; the second forecast value is a forecast result of the user load at a user side.

2. The net load forecasting method according to claim 1, wherein the extracting strongly correlated features from the new energy output data and the multiple pieces of external environmental data after the data preprocessing comprises:

calculating correlation coefficients between the new energy output data and the multiple pieces of external environmental data, and selecting at least one piece of external environmental data whose correlation coefficient is greater than a preset value from the multiple pieces of external environmental data; and using the selected at least one piece of external environmental data and the new energy output data together as the strongly correlated features.

3. The net load forecasting method according to claim 1, wherein the user load data is obtained from a dispatch and control cloud platform, an electric power marketing system, or an electric power market data report.

4. The net load forecasting method according to claim 1, wherein the multiple pieces of load influencing factor data comprise a weather influencing factor, a tax influencing factor, and a business influencing factor.

\* \* \* \* \*